US011216900B1

(12) United States Patent
Galyean (10) Patent No.: US 11,216,900 B1
(45) Date of Patent: Jan. 4, 2022

(54) INVESTIGATION SYSTEMS AND METHODS EMPLOYING POSITIONING INFORMATION FROM NON-RESIDENT DEVICES USED FOR COMMUNICATIONS WITH CONTROLLED-ENVIRONMENT FACILITY RESIDENTS

(71) Applicant: Securus Technologies, Inc., Carrollton, TX (US)

(72) Inventor: Brian Heith Galyean, Aurora, CO (US)

(73) Assignee: Securus Technologies, LLC, Carrollton, TX (US)

( * ) Notice: Subject to any disclaimer, the term of this patent is extended or adjusted under 35 U.S.C. 154(b) by 20 days.

(21) Appl. No.: 16/519,548

(22) Filed: Jul. 23, 2019

(51) Int. Cl.
*G06Q 50/26* (2012.01)
*G06Q 20/10* (2012.01)
*H04W 4/029* (2018.01)
*H04L 29/08* (2006.01)

(52) U.S. Cl.
CPC ............. *G06Q 50/26* (2013.01); *G06Q 20/10* (2013.01); *H04L 67/12* (2013.01); *H04W 4/029* (2018.02)

(58) Field of Classification Search
CPC ....... G06Q 50/26; G06Q 20/10; H04W 4/029; H04L 67/12
USPC ...................................................... 705/3–44
See application file for complete search history.

(56) References Cited

U.S. PATENT DOCUMENTS

| | | | |
|---|---|---|---|
| 6,072,396 A * | 6/2000 | Gaukel | G16H 40/67 340/573.4 |
| 7,447,194 B1 | 11/2008 | Schlesener et al. | |
| 8,983,446 B2 * | 3/2015 | Nadler | H04W 12/12 455/419 |
| 9,279,709 B2 * | 3/2016 | Etherington | G01F 1/6842 |
| 9,300,798 B1 * | 3/2016 | Welker-Muraguri | H04M 3/493 |
| 9,426,303 B1 * | 8/2016 | Edwards | H04W 4/023 |
| 9,729,709 B1 | 8/2017 | Edwards et al. | |

(Continued)

OTHER PUBLICATIONS

Brown, Kirk, "Stirling: Wireless companies hamper prison call-blocking", The Greenville News, Greenville, S.C., Proquest Doc. Id. 2223119099, May 12, 2019.*

*Primary Examiner* — Frantzy Poinvil
(74) *Attorney, Agent, or Firm* — Fogarty LLP (57) ABSTRACT

An investigative system uses positioning information, such as global position system information, from a non-resident device used for communication with a correctional facility inmate. Therein, a correctional facility communications application program upon installation on a non-resident communication device, prompts the non-resident to grant a waiver for an investigative data aggregation and analysis system associated with at least one correctional facility to access positioning information provided by the non-resident communication device, and prompts the non-resident to grant location reporting permission on the non-resident communication device, prior to use of the non-resident communication device to communicate with a correctional facility inmate. The investigative data aggregation and analysis system, thereafter, captures position data collected by the non-resident communication device. The investigative data aggregation and analysis system may analyze captured position data for a location of an event of investigative interest and provide an alert to an investigator, with the location.

21 Claims, 4 Drawing Sheets

(56) References Cited

U.S. PATENT DOCUMENTS

| | | | |
|---|---|---|---|
| 9,860,731 B1* | 1/2018 | Noonan | H04L 63/107 |
| 10,218,844 B1 | 2/2019 | Edwards et al. | |
| 10,367,599 B1* | 7/2019 | Noonan | H04W 48/04 |
| 10,681,495 B2* | 6/2020 | Hodge | H04W 12/1204 |
| 2002/0138417 A1 | 9/2002 | Lawrence | |
| 2004/0024694 A1 | 2/2004 | Lawrence et al. | |
| 2005/0251383 A1 | 11/2005 | Murray | |
| 2009/0304167 A1 | 12/2009 | Wright et al. | |
| 2011/0206038 A1 | 8/2011 | Hodge | |
| 2011/0293082 A1 | 12/2011 | Gauri | |
| 2012/0013475 A1 | 1/2012 | Farley et al. | |
| 2012/0195234 A1 | 8/2012 | Cai et al. | |
| 2013/0253831 A1 | 9/2013 | Langendorff | |
| 2013/0260795 A1 | 10/2013 | Papakipos et al. | |
| 2013/0263227 A1 | 10/2013 | Gongaware et al. | |
| 2013/0303192 A1 | 11/2013 | Louboutin et al. | |
| 2014/0092047 A1 | 4/2014 | Nara et al. | |
| 2014/0279767 A1 | 9/2014 | Torgersrud et al. | |
| 2016/0078281 A1 | 3/2016 | Gongaware et al. | |
| 2018/0158165 A1* | 6/2018 | Hodge | G06F 16/337 |
| 2018/0261025 A1* | 9/2018 | Kerning | H04W 4/02 |
| 2018/0300555 A1* | 10/2018 | Hodge | G08B 13/19684 |
| 2019/0149655 A1* | 5/2019 | Hodge | H04M 3/2281 379/88.08 |
| 2019/0191359 A1* | 6/2019 | Noonan | B01J 35/1042 |
| 2020/0092031 A1* | 3/2020 | Johnson | H04K 3/80 |

* cited by examiner

INVESTIGATION SYSTEMS AND METHODS EMPLOYING POSITIONING INFORMATION FROM NON-RESIDENT DEVICES USED FOR COMMUNICATIONS WITH CONTROLLED-ENVIRONMENT FACILITY RESIDENTS

TECHNICAL FIELD

The present disclosure relates generally to controlled-environment facilities, more particularly to investigations relating to controlled-environment facilities, and specifically to use of positioning information from non-resident devices used for communication with controlled-environment facility residents by an investigative data aggregation and analysis system.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have controlled contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including individual-to-individual videoconferences, which may be typically referred to as "video visitation," and online chat sessions.

Traditional communication services provide residents (inmates) of controlled-environment facilities (such as correctional facilities) a way to place outbound phone calls to non-residents of the controlled-environment facility. Additionally, non-residents can typically schedule video visitation with residents (inmates) of the controlled-environment facility. Other types of communication available to controlled-environment residents include the ability to exchange email and text messages between residents and non-residents of the controlled-environment facility. Basically, all of these forms of communication aim to facilitate communication between a resident of a controlled-environment facility and a non-resident.

Cellular phones are becoming the only home phones in an increasing number of U.S. households, a trend intensified by challenging economic conditions. The percentage of "wireless-only" phone use continues to grow on a national level. For example, preliminary results from the January-June 2017 National Health Interview Survey (NHIS) indicate more than one-half of American homes (52.5%) had only wireless telephones during the first half of 2017. Nearly three-quarters of all adults aged 25-34 were living in wireless-only households, and more than two-thirds (70.7%) of adults renting their homes were living in wireless-only households.

Additionally, over the past several years, the sharp increase in the U.S. inmate population has not been followed by a proportional increase in the number of prison or jail staff. To the contrary, budget pressures in local, state, and federal governments have made it difficult for correctional facilities to maintain an adequate number of wardens, officers, and other administration personnel. Hence, many correctional facilities are often unable to perform investigations with respect to their own inmates.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide use of positioning information from a non-resident device used for communication with a correctional facility inmate. Therein, a correctional facility communications application program (app), or the like, upon installation on a non-resident communication device, prior to use of the non-resident communication device to communicate with a correctional facility inmate, prompts the non-resident to grant a waiver for an investigative data aggregation and analysis system, or the like, associated with at least one correctional facility to access positioning information provided by the non-resident communication device. During installation, the app also prompts the non-resident to grant location reporting permission on the non-resident communication device.

The investigative data aggregation and analysis system, or the like, thereafter, captures position data of the non-resident communication device, collected by the non-resident communication device. This location data may be Global Positioning System (GPS) data collected by the non-resident communication device. Capture of the position data may include the correctional facility communications app, or the like, sending the position data to the investigative data aggregation and analysis system upon use of the non-resident communication device to take an action related to the inmate. This action related to the inmate is reception of a communication from the inmate by the non-resident communication device or initiation of a communication to the inmate on the non-resident communication device. The action related to the inmate may additionally, or alternatively be the non-resident making a deposit in an inmate trust account maintained by the correctional facility to the benefit of the inmate or a payment related to the inmate. Alternatively, or additionally, the investigative data aggregation and analysis system, or the like, may capture the position data of the non-resident communication device by querying the non-resident communication device for the position data, and the non-resident communication device reports the position data of the non-resident communication device to the investigative data aggregation and analysis system, in response to this query.

The investigative data aggregation and analysis system may analyze captured position data for a location of an event of investigative interest, and may provide an alert to an investigator, in response to analysis of captured position data, with the location of the event of investigative interest.

Additionally, the investigative data aggregation and analysis system, the correctional facility communications app, or the like, may determine, at a later time, whether the location reporting permission on the non-resident communication device is active. In response to a determination that the location reporting permission on the non-resident communication device is no longer enabled, the investigative data aggregation and analysis system, the correctional facility communications app, or the like, may disable communication between the non-resident communication device and the inmate.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Having thus described the invention in general terms, reference will now be made to the accompanying drawings, which are not necessarily drawn to scale, and wherein:

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to." Also, as used herein, a "call" may include a voice call, video call, text, or any other electronic communication.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

Embodiments of the present systems and methods relate generally to controlled-environment facilities, more particularly to investigations relating to controlled-environment facilities. However, in response to an inability of investigators to use locations, which slows down investigations, Embodiments of the present systems and methods relate specifically to use of positioning information from non-resident devices used for communication with controlled-environment facility residents (e.g., correctional facility inmates) by an investigative data aggregation and analysis system. In accordance with embodiments of the present systems and methods, an investigative system uses positioning information, such as global position system information, from a non-resident device used for communication with a correctional facility inmate. Therein, a correctional facility communications application program (app) upon installation on a non-resident communication device, prompts the non-resident to grant a waiver for an investigative data aggregation and analysis system associated with at least one correctional facility to access positioning information provided by the non-resident communication device, prior to use of the non-resident communication device to communicate with a correctional facility inmate. The app also prompts the non-resident to grant location reporting permission on the non-resident communication device, prior to use of the non-resident communication device to communicate with a correctional facility inmate. The investigative data aggregation and analysis system, thereafter, captures position data collected by the non-resident communication device. The investigative data aggregation and analysis system may analyze captured position data for a location of an event of investigative interest and provide an alert to an investigator, with the location. Thereby, with location information, investigators can immediately find suspects.

Thereby, in accordance with embodiments of the present systems and methods a controlled-environment facility communications app, which can be downloaded to, or updated on, smart phones, tablets or other smart devices, as well be preinstalled on controlled-environment facility communication vendor-provided devices, may provide information for investigative personnel by gathering Global Positioning System (GPS) location data on smart devices to locate the non-resident using the device for an investigative data aggregation and analysis system, associated with one, or characteristically more, controlled-environment facilities, during use of the device (and app) and/or on-demand. To wit, when agreeing to the installation of, or update to, this app, or the purchase of hardware with the pre-installed app, the user agrees to the terms and conditions which requires location permission on the device through the application, in accordance with embodiments of the present systems and methods. This tracking feature cannot, in accordance with embodiments of the present systems and methods, be turned off unless the user uninstalls the app.

Such reporting of GPS data by a controlled-environment facility communications app from a non-resident communication device provides enhanced location based services including enhancement of an ability to provide suspicious activity alerts (covertly, such as my be provided through a (centralized) investigative data aggregation and analysis system associated with one or more controlled-environment facilities and/or the like. The location data may be used to provide the location of a potential crime or other nefarious activity, via such an alert. For example, if during a phone call with an inmate (or soon after or before such a call) the non-resident is located at or near the residence of a victim of the inmate, an alert may be issued (via the investigative data aggregation and analysis system) to alert authorities to potential victim (and/or witness) intimidation, issue a VINE® (Victim Information and Notification Everyday) notice to the victim, or the like. In this manner, enhanced victim protection may be provided under embodiments of the present systems and methods through "reverse geofencing" for VINEs, such as with audible and visual alerts to one or more approved victim devices, or the like. Similarly, enhanced missing persons, or other current victim, location information may be provided to investigators, through alerts, employing embodiments of the present systems and methods.

Further investigative value that may be derived through embodiments of the present systems and methods may include allowing investigators to either overtly or covertly geo-fence non-resident communication devices which download the app, allowing investigators to ping the non-resident communication device, in real-time or near real-time, for the purpose of detecting timed and/or location patterns in the activity of the non-resident (such as it may relate to an inmate (resident), and/or the like. Embodiments of the present systems and methods may also add an ability to provide investigators a Uniform Resource Locator (URL) link to a trace map in (covert) alert texts, emails, or the like. In accordance with the forgoing, (a) further dimension(s) is (are) added to the data provided to a (centralized) investigative data aggregation and analysis system associated with one or more controlled-environment facilities, under embodiments of the present systems and methods.

Figure 1:
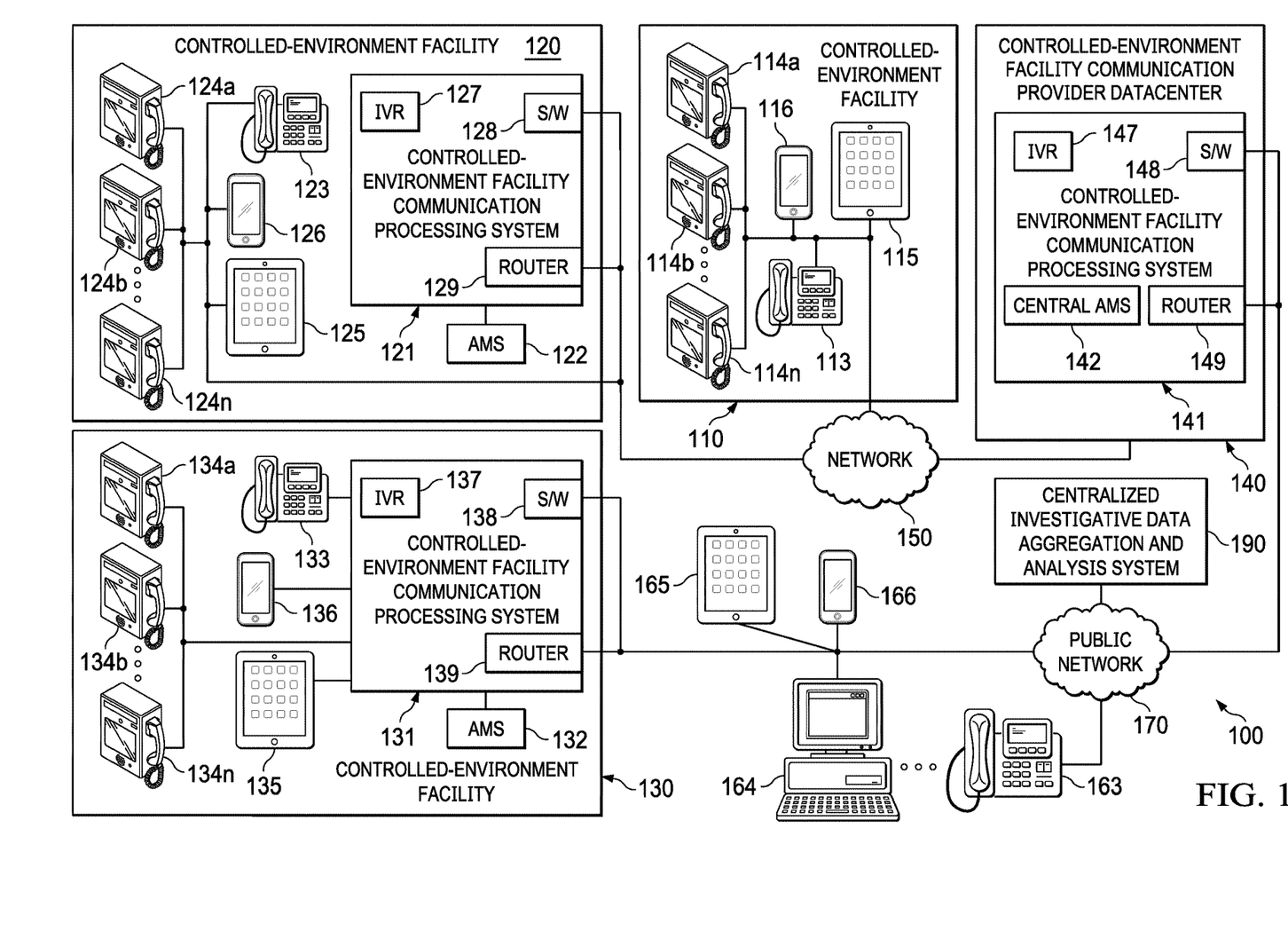
FIG. 1 is a diagrammatic illustration of an example communications environment, wherein an example embodiment of the present systems and methods for use of positioning information from non-resident devices used for communication with controlled-environment facility residents by an investigative data aggregation and analysis system may be deployed, or otherwise employed, with respect to multiple controlled-environment facilities, according to some embodiments.

FIG. 1 is a diagrammatic illustration of example communications environment 100, wherein an example embodiment of the present systems and methods for use of positioning information from non-resident devices used for communication with controlled-environment facility residents by an investigative data aggregation and analysis system may be employed, for example, with respect to multiple controlled-environment facilities 110, 120, etc., and/or a single controlled-environment facility (130), in accordance with some embodiments. Therein, onsite communication processing system 121, 131, external centralized communication processing system 141, such as may be deployed in a controlled-environment facility communications provider data center (140), or the like may provide telephone services, videoconferencing, online chat, e-messaging, and other communication services to residents of respective controlled-environment facility 110, 120, 130, etc. As illustrated, in some cases, a communication processing system (121, 131) may be co-located with a controlled-environment facility (120, 130, respectively). Alternatively, as also illustrated, a communication processing system (141) may be centrally or remotely located, such as in controlled-environment facility communications provider data center 140 in whole (such as with respect to facility 110) or in part (such as with respect to facility 120). Controlled-environment facility communications provider data center 140, and hence external centralized communication processing system 141, may be connected to such facilities via a public network (e.g. the Internet) or a private network, or the like (e.g. via a secure tunneling protocol over the internet, using encapsulation) (150) and may provide communication services to such multiple controlled-environment facilities. Such controlled-environment facility communication processing systems, particularly when deployed in, or in conjunction with, a controlled-environment facility communications provider data center (140), and/or in conjunction with onsite Administration Management System (AMS) 122, 132 (or a Jail Management System (JMS) in correctional environment embodiments), and/or external centralized AMS 142, may be referred to as a "controlled-environment facility secure communication platform," or the like. More generally, however, it should be noted that communication systems 121, 131, 141, etc. may assume a variety of forms, comprising, including and/or embodying telephony switches, such as electronic switching systems, or the like, and/or may be configured to serve a variety of facilities and/or users, whether within, or outside of, the respective controlled-environment facility.

Onsite AMS 122, 132 (or a Jail Management System (JMS) in correctional environment embodiments), and/or external centralized AMS 142 may be employed in accordance with various embodiments of the present systems and methods. In other embodiments, where the (central) controlled-environment facility communication system (141) is located remotely with respect to the controlled-environment facility (110, 120, etc.), access to AMS (or JMS) 122, 132, etc. may (also) be obtained via a computer network such as, for example, network 150. In various embodiments, the lives of resident/inmates may be electronically managed from intake/booking through release. An AMS (or JMS) deployed in conjunction with one or more correctional facilities provides management of various aspects thereof, such as facility management (including tracking inmates from booking through release), staff management (including time and attendance management and personnel dispatching), call management (including placing and blocking calls, accounting for call charges, distance commerce, determining credit worthiness of individuals, establishing and maintaining accounts, and handling purchases of goods and services), and inmate/resident management (including managing inmate information and tracking inmate activity). In accordance with embodiments of the present systems and methods, controlled-environment facility AMS 122, 132, etc. (e.g. a JMS with respect to correctional facilities), associated with at least one controlled-environment facility 120, 130 may maintain information with respect to the residents of the respective controlled-environment facility. An external remote, central AMS (142) may maintain information with respect to residents of one or more controlled-environment facilities (e.g. 110, 120). In the context of a correctional facility, the respective JMS or AMS databases may include information such as balances for inmate trust and calling accounts; trial schedule; conviction data; criminal record; sentencing data, time served, time remaining to be served, and release date; cell and cellmate assignments; inmate restrictions and warnings; commissary order history; telephone call history; call recordings made by the facility, or in accordance with present systems and methods; known or suspected gang or criminal affiliations; known or suspected affiliates, accomplices, or gang members; and any other information that may be relevant or useful to correctional facility staff to house and maintain inmates.

In some implementations, wherein the controlled-environment facility communication system (121, 131) is located within the controlled-environment facility (120, 130), it may have direct access to a respective AMS (122, 132) for garnering information used in accordance with various embodiments of the present systems and methods. In addition to providing certain visitation and communication operations, communication processing systems 121, 131, 141, etc. and/or AMS (or JMS) 122, 132, 142, etc. may attempt to ensure that a resident's calls, video conferences, online chats, e-messaging, etc. are performed only with non-residents whose identities, devices, email addresses, phone numbers, etc. are listed in that resident's Personal Allowed Number (PAN) or Pre-Approved Contact (PAC) list. Each resident's PAN or PAC list may be stored, for example, in a database maintained by respective AMS (or JMS) 122, 132 or 142, or the like. In addition to PAN or PAC list(s), AMS (or JMS) 122, 132 or 142 (databases), or the like, may also store inmate or resident profile data (RPD), as well as visitation rules applicable to each inmate or resident, Communication Detail Records (CDRs), or similar records, for resident phone calls, video visitations, texts, online chats, e-messaging, or the like.

Residents may use more-or-less conventional telephones 113, 123, 133, or the like to access certain communication services, under control of respective communication processing system 121, 131, 141, etc. In accordance with embodiments of the present systems and methods more-or-less conventional telephones 113, 123, 133 may be camera-enabled, or otherwise associated with controlled-environment facility cameras, or the like. Additionally, or alternatively, in some facilities a resident may use an intelligent controlled-environment facility media and/or communications terminal 114a through 114n, 124a through 124n, 134a through 134n, or the like, to place voice calls, as well as for video visitation, under control of respective communication processing system 131, 141, etc. Such an intelligent controlled-environment facility media and/or communications terminal may be referred to as an Intelligent Facility Device (IFD) (114, 124, 134), which may be a video phone particularly adapted for use in a controlled-environment facility, but which may be used to place voice calls, as well. Alternatively, or additionally, IFDs may take the form of, or be used as, a voice phone that may have a touchscreen interface. Generally speaking, IFDs may be disposed in a visitation room, in a pod, as part of a kiosk, etc. Additionally, or alternatively, in some facilities, residents may also use a personal computer wireless device, such as a tablet computing device 115, 125, 135, smartphone/media player 116, 126, 136, or the like, which may have been adapted and/or approved for use in a controlled-environment facility. Such a tablet computing device or smartphone/media player may be referred to as an intelligent controlled-environment facility resident media and/or communications device, Intelligent Resident Device (IRD), or the like, and in a correctional institution embodiment, as an intelligent inmate media and/or communications device Intelligent Inmate Device (IID), or the like. As will be appreciated, IRDs, IFDs, or other similar devices, as well as phones 113, 123, 133, etc. have communications capabilities, to enable a party to participate in telephone calls, video visitation sessions (video calls), or the like with other call parties, such as non-residents, under control of respective communication processing system 121, 131, 141, etc. IRDs 114a through 114n, 124a through 124n, 134a through 134n, IFDs 114, 124, 134, or other similar devices, may be referred to collectively or individually as "(a) controlled-environment facility communication and/or media device(s)," or the like.

For a resident to initiate an outgoing communication, the resident may initiate telephone services by lifting the receiver on telephone 113, 123,133, etc. or IFD 114, 124, 134, etc. and/or otherwise initiating a call, such as by launching an app on IRD 115, 125, 135, 116, 126, 136, etc. At which time, the resident may be prompted to provide a PIN, other identifying information or biometrics. Interactive voice response (IVR) unit 127, 137 or 147, which may be integrated into communication processing system 121, 131 and/or 141, as illustrated, may generate and play a prompt or other messages to the resident. Under the control of communication processing system 121, 131 and/or 141, etc. the device may be capable of connecting with a non-resident's device (e.g. telephone 163, non-resident computer 164, non-resident tablet computing device 165, non-resident smartphone/media player 166, or the like) across public network 170, such as a publicly switched telephone network (PSTN), an Integrated Services Digital Network (ISDN), Voice-over-IP (VoIP) or packet data network, such as for example the Internet, etc. Network 170 may be the same, or a different network, such as network 150. Telephony switches 128, 138, 148 etc. in respective communication processing system 121, 131, 141, etc. may be used to connect calls across a PSTN (i.e. network 170), such as calls from controlled-environment facility telephone 113, 123 or 133 and non-resident telephone 163, which, in accordance with embodiments of the present systems and methods, may also be camera-enabled. Telephony router 129, 139, 149, etc., media gateway functionality, or the like of respective communication system 121, 131, 141, etc. may be used to route data packets associated with a digital call connection, via an Integrated Services Digital Network (ISDN), the Internet, or the like (i.e. network 170). For example, a non-resident party may have a personal or laptop computer 164 with a webcam, or the like, or devices 165 or 166 may have an integrated camera and display (e.g., a smart phone, tablet, etc.). A network connection between the parties may be established and supported by an organization or commercial service that provides computer services and software for use in telecommunications and/or VoIP, such as SKYPE®. Additionally, or alternatively, the correctional facility and/or the destination may use videoconferencing equipment compatible with ITU H.323, H.320, H.264, and/or V.80, or other suitable standards. In accordance with various embodiments of the present systems and methods, non-resident's devices, telephone 163, non-resident computer 164, non-resident tablet computing device 165, non-resident smartphone/media player 166, and/or the like, may be disposed in the non-resident's home, place of work, on their person, or the like. Additionally, or alternatively the non-resident devices may be disposed in a visitation area of controlled-environment facility 110, 120, 130, etc., which may be within, adjacent to, or remote with respect to controlled-environment facility 110, 120, 130, etc., itself.

Such a communication initiated by a controlled-environment facility resident to a non-resident (or to another resident of a different, or the same, controlled-environment facility), or a communication initiated by a non-resident to a controlled-environment facility resident (inmate), may, such as in accordance with embodiments of the present systems and methods, require the non-resident device to have a controlled-environment (correctional) facility communications app installed on the non-resident's device, particularly if that device is a non-resident computer (164), or computer-based device, such as, non-resident tablet computing device 165, non-resident smartphone/media player 166, or the like.

In accordance with embodiments of the present systems and methods, as discussed in greater detail below, such a correctional (controlled-environment) facility communications app may, which upon installation (or initial activation) on a non-resident communication device (164, 165, 166), prompt a non-resident using the non-resident communications device to grant a waiver from the non-resident for an investigative data aggregation and analysis system (190) associated with at least one controlled-environment (correctional) facility, or the like, to access positioning information provided by the non-resident communication device. The app may also prompt the non-resident to grant location reporting permission on the non-resident communication device, prior to use of the non-resident communication device to communicate with a correctional (controlled-environment) facility inmate (resident). If, at a later time, it is determined (by the app, the secure communication platform, centralized investigative data aggregation and analysis system 190, or the like) that the location reporting permission on the non-resident communication device (164, 165, 166) is no longer active (for the application program), communication between the non-resident communication device and the inmate may be blocked, or otherwise disabled, such as by disabling the app on the non-resident communication device and/or blocking calls or other communications between the non-resident and the inmate.

Centralized investigative data aggregation and analysis system 190 may be a platform for providing investigative tools. Such investigative tools may provide collection, processing, analysis, and/or reporting of information for intelligence purposes. In some embodiments, the investigative tools may provide functions such as entity linkage analysis, communication statistics, organization analysis, communication behavior analysis, subscription usage analysis, common communication analysis, timelines, correlations, mapping, word search, language translation (whether machine translation or access to translation services), call recording (whether terminated external to the controlled-environment facility or internally thereto), call notification, call monitoring (whether real-time or recorded, and whether monitoring a particular call or a plurality of calls), call "barging," call control, visitation monitoring/background checking, crime tip conduit, account activity monitoring (whether tracing deposits and expenditures of monies or monitoring account trends and behavior, such as velocity of transactions), multiple database querying, and resource integration, and/or the like. One or more of these investigative tools may be provided through an intuitive user interface to provide ease of use, facilitate operations across a variety of user terminals, and/or to facilitate remote access to one or more features thereof. For example, in some cases, a web-based portal enabling individuals to store and transmit information, including forensic tools that analyze communications into and out of controlled-environment facilities to assist law enforcement may be provided. Such a web page portal may have menus comprising an investigator dashboard, to present and facilitate execution of various investigative operations. These investigative tools may log calls (e.g., as CDRs), so that an investigator may research them through an archive and may be provided access to internal and/or external criminal databases and/or other sources of useful information.

In accordance with embodiments of the present systems and methods, centralized investigative data aggregation and analysis system 190, or the like, captures position data of a non-resident communication device, collected by the non-resident communication device, such as, as a result of an event (e.g., the resident calling the non-resident, or vice-versa) or as a result of the centralized investigative data aggregation and analysis system inquiring as to the location of the non-resident communication device. The centralized investigative data aggregation and analysis system then analyzes this captured position data for a location of an event of investigative interest (e.g., occurrence of a crime, or the like).

Computer-based environment components may include programing and/or hardware to implement embodiments of the present systems and methods. This programming may take the form of stored program instructions, programed firmware, or the like, while hardware might take the form of an Application Specific Integrated Circuit (ASIC), or the like, to carry out such aspects of embodiments of the present systems and methods.

Figure 2:
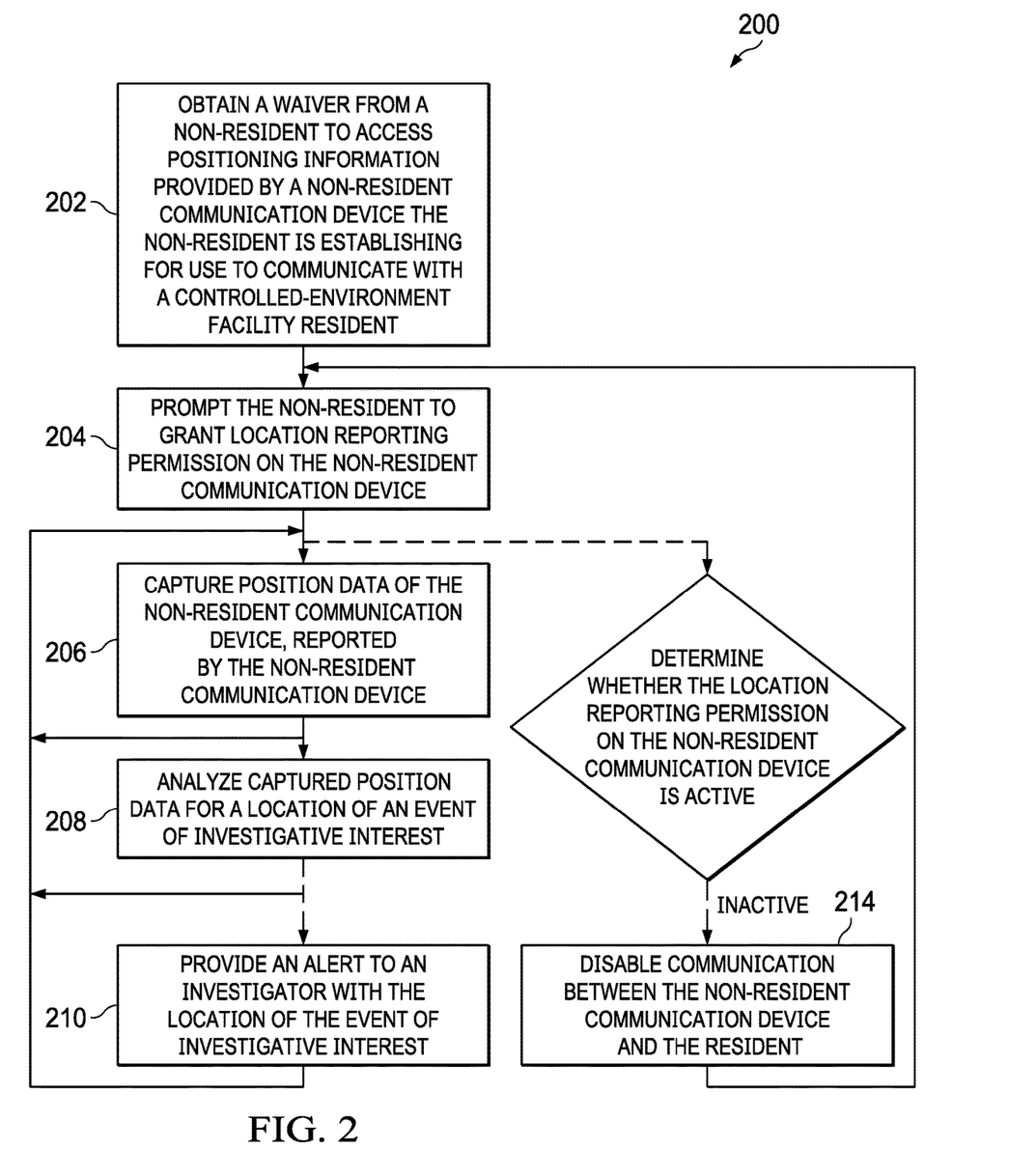
FIG. 2 is a flowchart of an example implementation of positioning information from non-resident devices used for communication with controlled-environment facility residents by an investigative data aggregation and analysis system, in accordance with some embodiments.

Embodiments of the present systems and methods may be employed in the above-described environment, such as in a manner described below, with respect to FIG. 2, a flowchart of example implementation 200 for use of positioning information from non-resident devices used for communication with controlled-environment facility residents by an investigative data aggregation and analysis system (190), or the like, in accordance with some embodiments. Therein, at 202, a controlled-environment facility secure communication platform (controlled-environment facility communication processing system 121, 131 and/or 141, and in some embodiments, controlled-environment facility AMS 122, 132 and/or 142), or the like, such as a correctional (controlled-environment) facility communications app, upon installation (or initial activation) on a non-resident communication device (164, 165, 166), obtains a waiver of right to privacy and/or authority to disclose location information, from the non-resident. This waiver allows, or the user otherwise grants a right for, an investigative data aggregation and analysis system (190) associated with one or more correctional facilities, or the like, to access positioning information provided by the non-resident communication device. This wavier, or user grants of a right to collect position data may be obtained as part of acceptance of an end user agreement for the correctional (controlled-environment) facility communications app during installation of the app on the non-resident communication device (164, 165, 166).

At 204, the non-resident communication device (164, 165, 166), such as, as a part of installation (and/or initial activation) of the app, prompts the non-resident to grant location reporting permission on the non-resident communication device, prior to use of the non-resident communication device to communicate with a controlled-environment (correctional) facility correctional facility inmate, or prior to allowing the non-resident communication device to carry out any other transactions with respect to the controlled-environment (correctional) facility, or the like.

Thereafter, the centralized investigative data aggregation and analysis system (190), or the like captures position data of a non-resident communication device that has been collected by the non-resident communication device (164, 165, 166) at 206. In accordance with embodiments of the present systems and methods, this location data is GPS data collected by the non-resident communication device. Capture of the location data at 206 may result from the non-resident communication device (i.e., the correctional (controlled-environment) facility communications app) sending the position data to the investigative data aggregation and analysis system upon use of the non-resident communication device (i.e., the correctional (controlled-environment) facility communications app) to take an action related to the inmate. The position data may be (randomly) sent to the investigative data aggregation and analysis system thereafter, such as while the non-resident communication device (i.e., the controlled-environment facility communications app) is in use for the communication with the non-resident, or the like. To wit, the action related to the inmate that the non-resident communication device (i.e., the correctional (controlled-environment) facility communications app) is used to take may be reception of a call or other communication from the inmate by the non-resident communication device, or initiation of a call or other communication to the inmate on the non-resident communication device, thereby prompting sending of the location data to the centralized investigative data aggregation and analysis system. Additionally, the action related to the inmate that the non-resident communication device (i.e., the correctional (controlled-environment) facility communications app) is used to take may be the non-resident making a deposit in an inmate trust account maintained by the controlled-environment (correctional) facility to the benefit of the inmate, another payment related to the inmate, or the like (using the controlled-environment (correctional) facility communications app). Additionally, or alternatively, capture of position data of the non-resident communications device may be prompted by the centralized investigative data aggregation and analysis system, or the like, querying the non-resident communication device for the position data. Whereupon, the non-resident communication device reports the position data of the device to the investigative data aggregation and analysis system, at 206.

At 208, the centralized investigative data aggregation and analysis system (190), or the like, analyzes the captured position data such as for whether this location, event and/or person, individually, or in some combination, is/are of investigative interest, such as, to indicate the location of occurrence of a crime, or the like. Whereupon, at 210, a (covert) alert text, email, or the like, is provided to an investigator, or the like (for example, a victim of the inmate), such as, by and/or via the investigative data aggregation and analysis system, if the location, event and/or person, individually, or in some combination, is/are of investigative interest.

Figure 3:
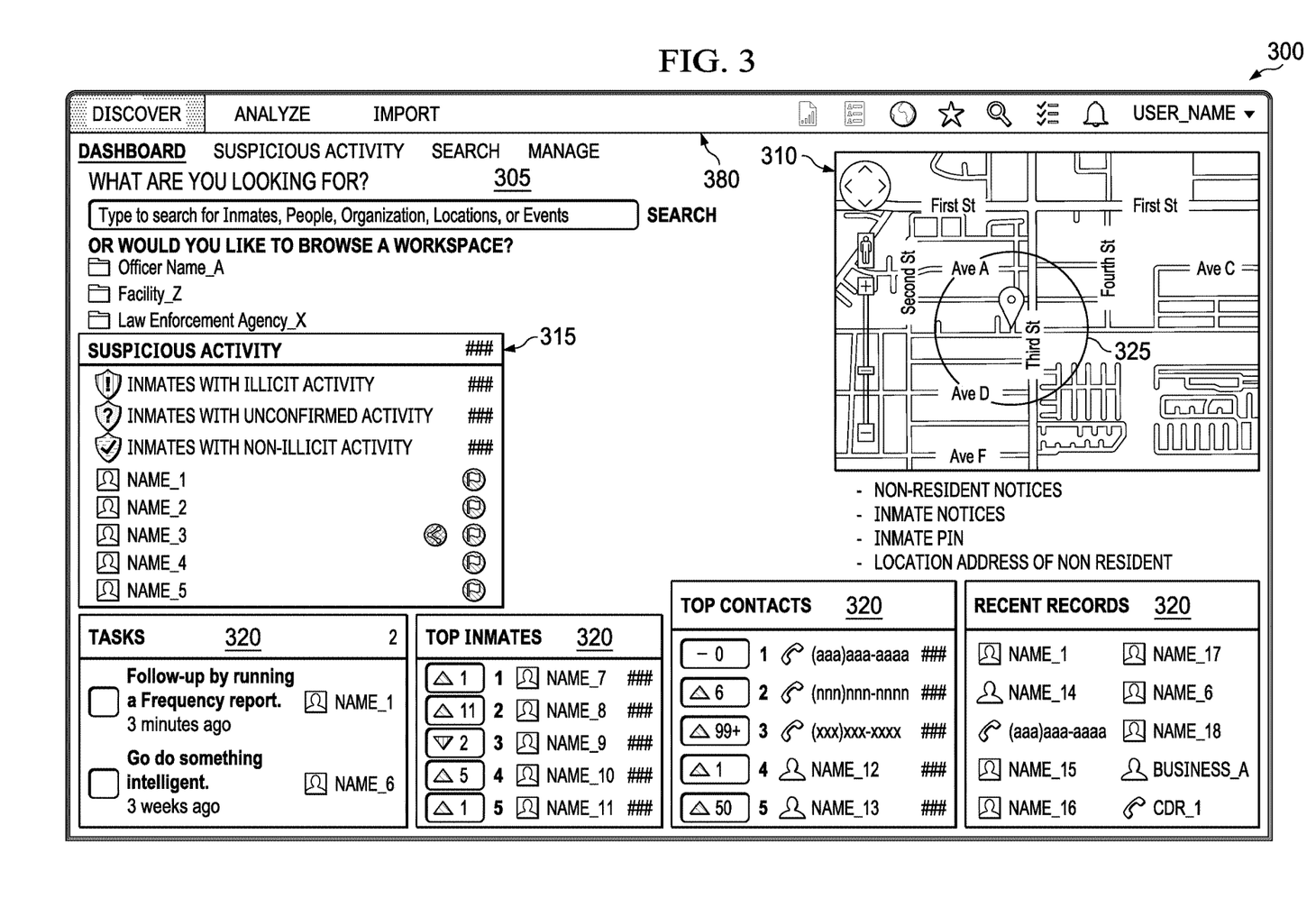
FIG. 3 is an illustration of an example centralized investigative data aggregation and analysis system web portal, showing an example dashboard screen, according to some embodiments.

The centralized investigative data aggregation and analysis system (190), may provide a web-based portal 300 to enable individuals, such as law enforcement, controlled-environment facility administrators or officers, or the like, to store and transmit information, although in other implementations investigative data aggregation and analysis in accordance with embodiments of the present systems and methods may, at least in part, be a stand-alone, executable program. FIG. 3 is an illustration of example centralized investigative data aggregation and analysis system web portal 300, showing example dashboard screen 305, according to some embodiments. The (covert) alert provided at 210 may, in accordance with various embodiments of the present systems and methods, include a URL link to this portal dashboard and/or (thereby) to trace map 310 for tracing the location of the non-resident's communication device, in accordance with position data sent from the device. Map 320 may also include location data for available police officers, or the like, such that a user may direct an officer to the location of the potential illicit activity. The centralized investigative data aggregation and analysis system portal may further include forensic tools that provide for analysis of communications into and out of controlled-environment facilities to assist law enforcement, controlled-environment facility personnel, and/or the like, employing data from and related to inmates of one or more correctional facilities or the like. The portal may include a dashboard, which displays, among other information, such as the aforementioned trace map, suspicious resident/inmate activity 315 and investigative "widgets" 320.

Further to the foregoing, GPS positioning information data may, in accordance with embodiments of the present systems and methods, be continually collected and/or retrieved on-demand, from investigators, police officers, or the like. Sources for such data may include squad cars, personal or issued cell phones, or any smart device with GPS capability that can be associated to such individuals or groups of such individuals. This GPS data may be used to increase efficiency of investigator or officer dispatch, so as to dispatch the closest investigator or officer, as available. For example, officer location could overlay call map 320, such that officers can be sent out to locations that are close where imminent danger is expected. This GPS data may also provide evidence to eliminate out of scope individuals in officer-involved shooting investigations, etc., add witness resources to an investigative case, such as by being able to ascertain dash cams and potential eyewitness accounts of other officers or investigators who are in the vicinity. This GPS data may additionally provide location of officers to victims to assist in rescue, or the like.

Returning to FIG. 2, at some time after obtaining the non-resident's grant to enable location reporting permission on the non-resident communication device at 204, a determination may be made at 212 as to whether the location reporting permission on the non-resident communication device is still active (for the controlled-environment (correctional) facility communications app). If it is determined at 212 that the location reporting permission on the non-resident communication device is no longer active (for the application program), communication between the non-resident communication device and the inmate may be blocked, or otherwise disabled, at 214, such as by disabling the controlled-environment (correctional) facility communications app on the non-resident communication device, and/or blocking calls between the non-resident and the inmate, at the (by the) controlled-environment facility secure communication platform. An attempt to call the resident (such as by first launching the app) or an incoming call from the resident to the non-resident communication device (which may result in the app attempting to launch) may result in a message being displayed on the non-resident device to grant location reporting permission on the device to permit a call from, or to the resident. However, in accordance with some embodiments of the present systems and methods, and/or in certain circumstances, such as based on the identity of the subject resident (or non-resident), calling privileges may not be immediately reinstated upon the location reporting permission being restored on the non-resident communication device, until further investigation. For example, deactivation and then reactivation of the location reporting permission may be an indication of occurrence of a nefarious event involving the non-resident and/or the resident. Hence, such deactivation and then reactivation of the location reporting permission that may be detected by the centralized investigative data aggregation and analysis system, in accordance with the present systems and methods, and may prompt issuance of an alert to an investigator.

Some embodiments of the present systems and methods may enable investigators to specify, such as via dashboard 305, a phone number (non-resident communication device) as "covert monitor" without further notice to the non-resident, based on the earlier provided waiver/rights granted and acceptance of location reporting permission. This feature may be useful to track a non-resident regardless of that party receiving or placing a call to or from an inmate.

Embodiments of the present systems and methods may also be configured to establish a geofence configured to allow calls or deny calls for security reasons, or to trigger alert(s) when the called party's location is within a pre-configured geographic region (i.e., in violation of one or more geo-fence rules). Such physical or geographic areas may be defined, such as via portal dashboard 305, in a linear fashion (e.g., west/east of a given longitude or north/south of a given latitude), a circular fashion (e.g., latitude and longitude of a center point plus a radius), by Zone Improvement Plan (ZIP), by area code, by city, county, state, etc. For example, embodiments of the present systems and methods may allow for authorized called party phone numbers to be configured to not disconnect if within geo-fence proximity, so as to allow calls to that number no matter how close they are to the facility, which will allow the communication to be established and/or to continue. Otherwise, corrective action may be implemented. Examples of corrective action include, but are not limited to, terminating the communication, recording the communication, providing a live-monitoring feed of the communication to an investigator or prison staff, etc.

In various embodiments, portal dashboard 305 may provide a user interface to authorized users (e.g., investigative staff or the like) that allow a user to view, create, and edit geo-fencing rules, call detail records, mapped location information, margins of uncertainty, etc. For example, portal dashboard 305 may, be configured to report on related calls within a selectable proximity to one or more areas, to display such on a geographic map, to display a correlation between a device's Billed Number Address (BNA) and physical location, etc. Portal dashboard 305 may also allow authorized users to take predetermined actions and to receive real time information through the web service outside of any current calls in progress. For example, assume an inmate calls a non-resident party at a given time. The called party's latitude and longitude puts the called party at a murder scene at the same time as the inmate phone call. Sometime later, the investigator may wish to know where the called party, who is a suspect in the murder case, is located. As such, the investigator may take an action via portal dashboard 305 to receive the desired location information of the called party, since the non-resident party has provided the aforementioned waiver and granted the aforementioned location reporting permission.

Portal dashboard 305, or the like may allow a user to view overlapping geo-fencing rules. These rules may be facility-wide rules, as well as rules that are applicable to individual inmates or groups of inmates (e.g., known gangs, etc.). For example, for each rule one or more of the following may be provided: the name of the rule, the status of the rule (e.g., enabled or disabled), the type of rule (e.g., circular, ZIP, etc.), one or more parameters associated with the rule (e.g., radius, etc.), whether the rule is positively or negatively defined (i.e., whether a mobile device may receive a call if within a selected area or if outside of that area, respectively), etc. Other information may include a number of geo-fencing rule violations associated with each rule, CDRs for each violation, etc. Also, as noted a map 310 of screenshot portal dashboard 305 may provide a geographic indication of the geographic rule selected. Upon selection of a rule, map 305 may render location information for communication(s) associated with each rule violation, for example.

Portal dashboard 305, or the like, may also allow the user to enter or edit one or more fields for one or more geo-fencing rules. For example, the user may select a scope of the rule (e.g., facility-wide, for a group of inmates, for an individual inmate, etc.), as well as a name of the rule, a type of rule (e.g., circular, etc.), one or more rule parameters, and one or more actions (e.g., alerts, etc.) to be taken in response to a violation of that rule. Examples of rule information that may be added to any given rule may include, but are not limited to, a description of the rule; a status of the rule (e.g., active, inactive, etc.); an address, city, state, ZIP code, latitude, longitude, radius, diameter, length, or measurement or a region associated with the rule; a start time, start date, end time, and end date for the rule; an identification of a person or persons who created the rule and its date of creation; the name of an author or authors of one or more previous rule modification and the date of such modifications; an indication of whether the rule is private or shared; etc. As shown, map 310 may automatically represent region 325 covered by the geo-fencing rule overlaid upon a geographic map. Furthermore, the size, type, and location of region 325 may be updated continuously and/or in response to a modification of the respective geofencing rule(s). The map may be interactive, and the investigator may manipulate or pinpoint the locations on the map in order to generate or create the geo-fencing rule(s) (related thereto).

Portal dashboard 305 may show "statistics," information regarding the execution of one or more geo-fencing rules. For example, a user may select one or more rules and desired statistics, and a corresponding graph, or the like, may be rendered. Examples of statistics include, but are not limited to, a number of call terminations, a number of alerts issued, a number of live-monitoring events, a number of recording events, etc. These statistics may be presented by date, time, inmate, non-resident, phone number or device ID, etc. In some embodiments, a "compare" button or hyperlink may allow the user to combine statistics of two or more rules on a single graph (e.g., in different colors), for example. Also, the user may select one or more elements on a displayed graph to display a map, similar to map 310, showing location information for one or more calls affected by the selected rule(s).

Portal dashboard 305 may, such as in map 310, show a path of the non-resident by rendering a trajectory of the non-resident's mobile device as the non-resident physically moves. Time stamps may be shown along the route, so as to indicate pauses, or times of particular events, such as when the mobile device violates a geo-fencing rule (and the call was terminated), or the like. In some embodiments, a sliding cursor, or the like may allow an investigator to retrace such a trajectory and determine at what location the non-resident party was during what point of the call. In cases where the call is recorded, for instance, the cursor may be synchronized with the audio recording to facilitate review. As an example, if the non-resident picks-up another party up at some point on the way to the resident's facility, synchronized review allows an investigator to identify when and where such an event took place. In some cases, when the investigator replays the recording, the sliding cursor may move along the trajectory. Additionally, or alternatively, the sliding cursor may be used to pause, rewind or forward the audio recording.

Dialog boxes, or the like, with aforementioned call information may be displayed in portal dashboard map 310, at predetermined points of the trajectory and/or may be displayed with the cursor. In various embodiments, such map feature(s) may be displayed in real-time, as the call or communication progresses. Additionally, or alternatively, the map feature(s) may be stored as part of a CDR or the like. As such, these feature(s) may allow the display of true call termination on a map, in addition to the facility address location and the BNA location. This may provide a full picture of where the call came from, where it terminated to, and/or the address it is registered to. It may also help law enforcement by providing not only the called parties home address, but where they were at the time of the call. Additionally, it may tell law enforcement where a non-resident is in proximity to the controlled-environment facility as well as where he or she was in proximity to their home address.

Figure 4:
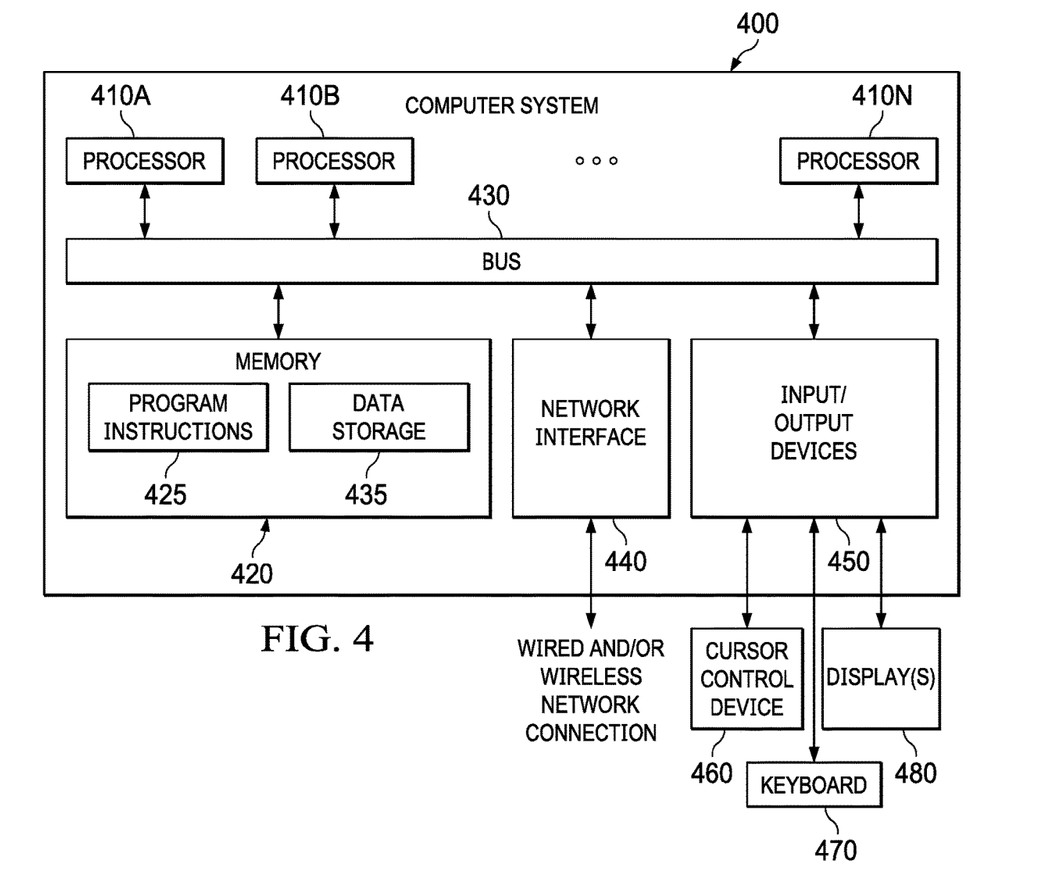
FIG. 4 is a block diagram of a computer system, device, station, or terminal configured to implement various techniques disclosed herein, according to some embodiments.

Embodiments of the present systems and methods for use of positioning information from non-resident devices used for communication with controlled-environment facility residents by an investigative data aggregation and analysis system, as described herein, may be implemented at least in part as, or executed, at least in part, by one or more computer systems. One such computer system is illustrated in FIG. 4. In various embodiments, computer system 400 may be a server, a mainframe computer system, a workstation, a network computer, a desktop computer, a laptop, a tablet computing device, media player, or the like. For example, in some cases, computer 400 may implement one or more steps of example process 200 described above with respect to FIG. 2, and/or a computer system such as computer system 400 may be used as, or as part of, one or more of: controlled environment facility communications management systems 121, 131 and/or 141; AMSs, 122, 132 and/or 142; centralized investigative data aggregation and analysis system 190; controlled-environment facility resident communications devices 113 through 116, 123 through 126, and 133 through 136; non-resident communications devices 163 through 166; and/or the like. In various embodiments two or more of these computer systems may be configured to communicate with each other in any suitable way, such as, for example, via public network 170, which may be the Internet, or the like, as discussed above, via a local area network using wired or wireless functionality, etc.

As illustrated, computer system 400 includes one or more processors 410A-N coupled to a system memory 420 via bus 430. Computer system 400 further includes a network interface 440 coupled to bus 430, and one or more I/O controllers 450, which in turn are coupled to peripheral devices such as cursor control device 460, keyboard 470, display(s) 480, etc. Each of I/O devices 460, 470, 480 may be capable of communicating with I/O controllers 450, for example, via a wired connection (e.g., serial port, Universal Serial Bus port) or wireless connection (e.g., Wi-Fi, Bluetooth, Near Field Communications Link, etc.). Other devices may include, for example, microphones, antennas/wireless transducers, phone detection modules, etc.

In various embodiments, computer system 400 may be a single-processor system including one processor 410A, or a multi-processor system including two or more processors 410A-N (e.g., two, four, eight, or another suitable number). Processors 410 may be any processor capable of executing program instructions. For example, in various embodiments, processors 410 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 410 may commonly, but not necessarily, implement the same ISA. Also, in some embodiments, at least one processor 410 may be a graphics processing unit (GPU) or another dedicated graphics-rendering device.

System memory 420 may be configured to store program instructions and/or data accessible by processor 410. In various embodiments, system memory 420 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations and modules such as those described herein may be stored within system memory 420 as program instructions 425 and data storage 435, respectively. In other embodiments, program instructions and/or data may be received, sent, or stored upon different types of computer-accessible media or on similar media separate from system memory 420 or computer system 400.

A computer-accessible medium may include any tangible and/or non-transitory storage media or memory media such as electronic, magnetic, or optical media—e.g., disk or CD/DVD-ROM coupled to computer system 400 via bus 430. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 430 may be configured to coordinate I/O traffic between processor 410, system memory 420, and any peripheral devices in the computer system, including network interface 440 or other peripheral interfaces, such as I/O devices 460, 470, 480. In some embodiments, bus 430 may perform any necessary protocol, timing, or other data transformations to convert data signals from one component (e.g., system memory 420) into a format suitable for use by another component (e.g., processor 410). In some embodiments, bus 430 may include support for devices attached through various types of peripheral buses, such as a variant of the Peripheral Component Interconnect (PCI) bus standard or the Universal Serial Bus (USB) standard, for example. In some embodiments, the function of bus 430 may be split into two or more separate components, such as a northbridge chipset and a southbridge chipset, for example. In addition, in some embodiments some or all the functionality of bus 430, such as an interface to system memory 420, may be incorporated directly into processor(s) 410A-N.

Network interface 440 may be configured to allow data to be exchanged between computer system 400 and other devices attached to a network, such as other computer systems, or between nodes of computer system 400. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 450 may, in some embodiments, enable communications with one or more display terminals, keyboards, keypads, touchpads, scanning devices, voice or optical recognition devices, mobile devices, or any other devices suitable for entering or retrieving data by one or more computer system 400. Multiple I/O controllers 450 may be present in computer system 400 or may be distributed on various nodes of computer system 400. In some embodiments, I/O devices may be separate from computer system 400 and may interact with one or more nodes of computer system 400 through a wired or wireless connection, such as over network interface 440.

As shown in FIG. 4, system memory 420 may include program instructions 425, configured to implement certain embodiments described herein, and data storage 435, comprising various data may be accessible by program instructions 425. In an embodiment, program instructions 425 may include software elements, which may be configured to affect the operations discussed in FIGS. 1 through 4. Program instructions 425 may be implemented in various embodiments using any desired programming language, scripting language, or combination of programming languages and/or scripting languages (e.g., C, C++, C#, JAVA®, JAVASCRIPT®, PERL®, etc.). Data storage 435 may include data that may be used in these embodiments (e.g., recorded communications, profiles for different modes of operations, etc.). In other embodiments, other or different software elements and data may be included.

A person of ordinary skill in the art will appreciate that computer system 400 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The various operations described herein, particularly in connection with FIGS. 1 through 4, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An investigative system for use of positioning information from a non-resident device used for communication with a correctional facility inmate comprising:
   a correctional facility communications application program, which upon installation on a non-resident communication device, prompts a non-resident using the non-resident communications device to grant a waiver from the non-resident for an investigative data aggregation and analysis system associated with at least one correctional facility to access positioning information provided by the non-resident communication device, and prompts the non-resident to grant location reporting permission on the non-resident communication device, prior to use of the non-resident communication device to communicate with said correctional facility inmate; and
   said investigative data aggregation and analysis system comprising at least one processor and a memory coupled to the at least one processor and storing program instructions thereupon, which when executed by the at least one processor, cause the investigative data aggregation and analysis system to capture position data of the non-resident communication device, collected by the non-resident communication device.

2. The system of claim 1 wherein the position data is global positioning system data collected by the non-resident communication device.

3. The system of claim 1, wherein the investigative data aggregation and analysis system program instructions further cause the investigative data aggregation and analysis system to analyze captured position data for a location of an event of investigative interest.

4. The system of claim 3, wherein the investigative data aggregation and analysis system program instructions further cause the investigative data aggregation and analysis system to, provide an alert to an investigator, in response to analysis of captured position data, with the location of the event of investigative interest.

5. The system of claim 1, wherein capture of the position data further comprises the correctional facility communications application program sending the position data to the investigative data aggregation and analysis system upon use of the non-resident communication device to take an action related to the inmate.

6. The system of claim 5, wherein the action related to the inmate is reception of a communication from the inmate by the non-resident communication device or initiation of a communication to the inmate on the non-resident communication device.

7. The system of claim 5, wherein the action related to the inmate is the non-resident making a deposit in an inmate trust account maintained by the correctional facility to the benefit of the inmate or payment related to the inmate.

8. The system of claim 1, wherein the investigative data aggregation and analysis system program instructions further cause the investigative data aggregation and analysis system to, capture the position data of the non-resident communication device by querying the non-resident communication device for the position data and the non-resident communication device reporting the position data of the non-resident communication device to the investigative data aggregation and analysis system, in response to this query.

9. The system of claim 1, wherein the investigative data aggregation and analysis system program instructions further cause the investigative data aggregation and analysis system to determine, or the correctional facility communications application program determines, at a later time, whether the location reporting permission on the non-resident communication device is active; and
the investigative data aggregation and analysis system program instructions further cause the investigative data aggregation and analysis system to disable, or the correctional facility communications application program disables, communication between the non-resident communication device and the inmate in response to a determination that the location reporting permission on the non-resident communication device is no longer enabled.

10. A method for use of positioning information from a non-resident device used for communication with a correctional facility inmate comprising:
obtaining, by a correctional facility secure communication platform associated with at least one correctional facility, a waiver from a non-resident for an investigative data aggregation and analysis system associated with at least one correctional facility to access positioning information provided by a non-resident communication device the non-resident is establishing for use to communicate with at least one correctional facility inmate, prior to use of this non-resident communication device to communicate with a correctional facility inmate;
prompting the non-resident to grant location reporting permission on the non-resident communication device, prior to use of this non-resident communication device to communicate with said correctional facility inmate;
capturing, by the investigative data aggregation and analysis system, position data of the non-resident communication device, reported by the non-resident communication device; and
analyzing, by the investigative data aggregation and analysis system, captured position data for a location.

11. The method of claim 10, wherein establishing the non-resident communication device for use by the non-resident to communicate with at least one inmate comprises installing a correctional facility communications application program on the non-resident communication device, prior to use of the non-resident communication device to communicate with a correctional facility resident, and the correctional facility communications application program carrying out the prompting of the non-resident to grant the location reporting permission on the non-resident communication device.

12. The method of claim 10, wherein the position data is global positioning system data collected by the non-resident communication device.

13. The method of claim 10, wherein capturing the position data further comprises the non-resident communication device sending the position data to the investigative data aggregation and analysis system upon use of the non-resident communication device to take an action related to the inmate.

14. The method of claim 13, wherein the action related to the inmate is reception of a communication from the inmate by the non-resident communication device or initiation of a communication to the inmate on the non-resident communication device.

15. The method of claim 13, wherein the action related to the inmate is the non-resident making a deposit in an inmate trust account maintained by the correctional facility to the benefit of the inmate or payment related to the inmate.

16. The method of claim 10, wherein capturing position data of the non-resident communication device further comprises querying the non-resident communication device, by the investigative data aggregation and analysis system, for the position data and the non-resident communication device reporting the position data of the non-resident communication device to the investigative data aggregation and analysis system, in response to this query.

17. The method of claim 10, further comprising determining, at a later time, whether the location reporting permission on the non-resident communication device is active, and disabling communication between the non-resident communication device and the inmate in response to a determination that the location reporting permission on the non-resident communication device is no longer active.

18. The method of claim 10, further comprising providing an alert to an investigator, in response to analysis of captured position data, with the location of an event of investigative interest.

19. A tangible non-transitory computer-readable storage medium having program instructions stored thereon that, upon execution by at least one computer system associated with at least one correctional facility, cause the at least one computer system to:

obtain a waiver from a non-resident for at least one other computer system associated with at least one correctional facility to access positioning information provided by a non-resident communication device the non-resident is establishing for use to communicate with at least one correctional facility inmate, prior to use of this non-resident communication device to communicate with a correctional facility inmate;

prompt the non-resident to grant location reporting permission on the non-resident communication device, prior to use of this non-resident communication device to communicate with a correctional facility inmate;

capture position data of the non-resident communication device, reported by the non-resident communication device; and analyze captured position data for a location.

20. The tangible non-transitory computer-readable storage medium of claim 19, wherein execution of the program instructions further cause the at least one computer system associated with at least one corrections facility to:

determine, at a later time, whether the location reporting permission on the non-resident communication device is active; and disable communication between the non-resident communication device and the inmate in response to a determination that the location reporting permission on the non-resident communication device is no longer active.

21. The tangible non-transitory computer-readable storage medium of claim 19, wherein execution of the program instructions further cause the at least one computer system associated with at least one corrections facility to provide an alert to an investigator, in response to analysis of captured position data, with the location of an event of investigative interest.

* * * * *